(12) United States Patent
Vervaet et al.

(10) Patent No.: US 10,228,867 B2
(45) Date of Patent: Mar. 12, 2019

(54) DISTRIBUTED OBJECT STORAGE SYSTEM COMPRISING PERFORMANCE OPTIMIZATIONS

(71) Applicant: AMPLIDATA NV, Lochristi (BE)

(72) Inventors: Stefaan Vervaet, San Francisco, CA (US); Frederik De Schrijver, Wenduine (BE); Wim De Wispelaere, Ghent (BE); Wouter Van Eetvelde, Sint-Amandsberg (BE)

(73) Assignee: AMPLIDATA NV, Lochristi (BE)

( * ) Notice: Subject to any disclaimer, the term of this patent is extended or adjusted under 35 U.S.C. 154(b) by 47 days.

(21) Appl. No.: 14/060,294

(22) Filed: Oct. 22, 2013

(65) Prior Publication Data

US 2014/0122441 A1    May 1, 2014

(30) Foreign Application Priority Data

Oct. 26, 2012  (EP) .................................. 12190158

(51) Int. Cl.
*G06F 17/30* (2006.01)
*G06F 11/20* (2006.01)
(Continued)

(52) U.S. Cl.
CPC ........ *G06F 3/0614* (2013.01); *G06F 11/1076* (2013.01); *G06F 11/1464* (2013.01); *G06F 11/2094* (2013.01); *G06F 17/3007* (2013.01); *G06F 17/30489* (2013.01); *G06F 3/067* (2013.01); *G06F 3/0646* (2013.01)

(58) Field of Classification Search
CPC ...... G06F 3/0649; G06F 3/065; G06F 3/0653; G06F 3/0671; G06F 3/0619; G06F 11/3409; G06F 11/2094; G06F 17/30283; G06F 17/30286; G06F 17/3012; G06F 17/301; G06F 17/30094; G06F 17/30575; G06F 211/1028; G06F 17/30489; G06F 17/3007; G06F 11/1464; G06F 11/1076; G06F 3/0614; G06F 3/0646; G06F 3/067
See application file for complete search history.

(56) References Cited

U.S. PATENT DOCUMENTS 7,418,620 B1    8/2008  Tormasov
8,386,840 B2 *  2/2013  Stougie ............... G06F 11/1076
                                                714/6.2
(Continued)

FOREIGN PATENT DOCUMENTS

WO    2009135630 A2    11/2009
WO    2012089701 A1    7/2012

OTHER PUBLICATIONS

European Search Report for corresponding EP application 12190158.1, dated Feb. 28, 2013.

*Primary Examiner* — Srirama Channavajjala
(74) *Attorney, Agent, or Firm* — Patent Law Works LLP

(57) ABSTRACT

A distributed object storage system comprises an encoding module configured to calculate for a plurality of predetermined values of the spreading requirement the cumulative size of the sub fragment files when stored on the file system with the predetermined block size; and select as a spreading requirement from said plurality of predetermined values a calculated value that is equal to one of said predetermined values for which the cumulative size is minimal.

20 Claims, 11 Drawing Sheets

(51) Int. Cl.
*G06F 3/00* (2006.01)
*G06F 3/06* (2006.01)
*G06F 11/14* (2006.01)
*G06F 11/10* (2006.01)

(56) References Cited

U.S. PATENT DOCUMENTS

| | | | |
|---|---|---|---|
| 8,433,849 B2* | 4/2013 | De Schrijver | G06F 11/2094 711/114 |
| 9,135,136 B2* | 9/2015 | De Schrijver | G06F 11/3409 |
| 2002/0078244 A1 | 6/2002 | Howard | |
| 2002/0138559 A1* | 9/2002 | Ulrich | G06F 17/30067 709/203 |
| 2003/0182502 A1* | 9/2003 | Kleiman | G06F 3/0613 711/114 |
| 2005/0114596 A1 | 5/2005 | Golding | |
| 2005/0144514 A1 | 6/2005 | Ulrich | |
| 2007/0043734 A1* | 2/2007 | Cannon | G06F 17/30489 |
| 2007/0136525 A1* | 6/2007 | Read | G06F 11/1076 711/114 |
| 2008/0005334 A1* | 1/2008 | Utard | G06F 11/1076 709/226 |
| 2008/0010500 A1* | 1/2008 | Shimmitsu | G06F 11/2094 714/6.32 |
| 2008/0115017 A1* | 5/2008 | Jacobson | G06F 11/1076 714/710 |
| 2008/0140947 A1* | 6/2008 | Slik | G06F 3/0605 711/154 |
| 2008/0313241 A1 | 12/2008 | Li et al. | |
| 2010/0037056 A1* | 2/2010 | Follis | G06F 11/1464 713/171 |
| 2010/0162076 A1* | 6/2010 | Sim-Tang | H03M 13/3776 714/752 |
| 2010/0169589 A1* | 7/2010 | Jalali | G06F 11/2071 711/162 |
| 2011/0113282 A1 | 5/2011 | De Spiegeleer et al. | |
| 2011/0191300 A1* | 8/2011 | Orenstein | G06F 17/30 707/646 |
| 2011/0196845 A1* | 8/2011 | Cannon | G06F 17/30489 707/687 |

* cited by examiner

| f | n | r | 520 | Tot. 600 | 700 | 700 4kB | Tot. 700 4kB | r 4kB |
|---|---|---|---|---|---|---|---|---|
| 4 | 5 | 5,00 | 3072 | 15.360 | 3.072 | 4096 | 20480 | 6,67 |
|   | 6 | 3,00 | 3072 | 9.216 | 1.536 | 4096 | 24576 | 8,00 |
|   | 7 | 2,33 | 3072 | 7.168 | 1.024 | 4096 | 28672 | 9,33 |
|   | 8 | 2,00 | 3072 | 6.144 | 768 | 4096 | 32768 | 10,67 |
|   | 9 | 1,80 | 3072 | 5.530 | 614 | 4096 | 36864 | 12,00 |
|   | 10 | 1,67 | 3072 | 5.120 | 512 | 4096 | 40960 | 13,33 |
|   | 11 | 1,57 | 3072 | 4.827 | 439 | 4096 | 45056 | 14,67 |
|   | 12 | 1,50 | 3072 | 4.608 | 384 | 4096 | 49152 | 16,00 |
|   | 13 | 1,44 | 3072 | 4.437 | 341 | 4096 | 53248 | 17,33 |
|   | 14 | 1,40 | 3072 | 4.301 | 307 | 4096 | 57344 | 18,67 |
|   | 15 | 1,36 | 3072 | 4.189 | 279 | 4096 | 61440 | 20,00 |
|   | 16 | 1,33 | 3072 | 4.096 | 256 | 4096 | 65536 | 21,33 |

Fig. 7

| f | n | r | 520 | Tot. 600 | 700 | 700 4kB | Tot. 700 4kB | r 4kB |
|---|---|---|---|---|---|---|---|---|
| 4 | 5 | 5,00 | 4096 | 20.480 | 4.096 | 4096 | 20480 | 5,00 |
|   | 6 | 3,00 | 4096 | 12.288 | 2.048 | 4096 | 24576 | 6,00 |
|   | 7 | 2,33 | 4096 | 9.557 | 1.365 | 4096 | 28672 | 7,00 |
|   | 8 | 2,00 | 4096 | 8.192 | 1.024 | 4096 | 32768 | 8,00 |
|   | 9 | 1,80 | 4096 | 7.373 | 819 | 4096 | 36864 | 9,00 |
|   | 10 | 1,67 | 4096 | 6.827 | 683 | 4096 | 40960 | 10,00 |
|   | 11 | 1,57 | 4096 | 6.437 | 585 | 4096 | 45056 | 11,00 |
|   | 12 | 1,50 | 4096 | 6.144 | 512 | 4096 | 49152 | 12,00 |
|   | 13 | 1,44 | 4096 | 5.916 | 455 | 4096 | 53248 | 13,00 |
|   | 14 | 1,40 | 4096 | 5.734 | 410 | 4096 | 57344 | 14,00 |
|   | 15 | 1,36 | 4096 | 5.585 | 372 | 4096 | 61440 | 15,00 |
|   | 16 | 1,33 | 4096 | 5.461 | 341 | 4096 | 65536 | 16,00 |

Fig. 8

| f | n | r | 520 | Tot. 600 | 700 | 700 4kB | Tot. 700 4kB | 4kB |
|---|---|---|---|---|---|---|---|---|
| 4 | 5 | 5,00 | 5120 | 25.600 | 5.120 | 8192 | 40960 | 8,00 |
|   | 6 | 3,00 | 5120 | 15.360 | 2.560 | 4096 | 24576 | 4,80 |
|   | 7 | 2,33 | 5120 | 11.947 | 1.707 | 4096 | 28672 | 5,60 |
|   | 8 | 2,00 | 5120 | 10.240 | 1.280 | 4096 | 32768 | 6,40 |
|   | 9 | 1,80 | 5120 | 9.216 | 1.024 | 4096 | 36864 | 7,20 |
|   | 10 | 1,67 | 5120 | 8.533 | 853 | 4096 | 40960 | 8,00 |
|   | 11 | 1,57 | 5120 | 8.046 | 731 | 4096 | 45056 | 8,80 |
|   | 12 | 1,50 | 5120 | 7.680 | 640 | 4096 | 49152 | 9,60 |
|   | 13 | 1,44 | 5120 | 7.396 | 569 | 4096 | 53248 | 10,40 |
|   | 14 | 1,40 | 5120 | 7.168 | 512 | 4096 | 57344 | 11,20 |
|   | 15 | 1,36 | 5120 | 6.982 | 465 | 4096 | 61440 | 12,00 |
|   | 16 | 1,33 | 5120 | 6.827 | 427 | 4096 | 65536 | 12,80 |

Fig. 9

| f | n | r | 520 | Tot. 600 | 700 | 700 4kB | Tot. 700 4kB | 4kB |
|---|---|---|---|---|---|---|---|---|
| 4 | 5 | 5,00 | 8192 | 40.960 | 8.192 | 8192 | 40960 | 5,00 |
|   | 6 | 3,00 | 8192 | 24.576 | 4.096 | 4096 | 24576 | 3,00 |
|   | 7 | 2,33 | 8192 | 19.115 | 2.731 | 4096 | 28672 | 3,50 |
|   | 8 | 2,00 | 8192 | 16.384 | 2.048 | 4096 | 32768 | 4,00 |
|   | 9 | 1,80 | 8192 | 14.746 | 1.638 | 4096 | 36864 | 4,50 |
|   | 10 | 1,67 | 8192 | 13.653 | 1.365 | 4096 | 40960 | 5,00 |
|   | 11 | 1,57 | 8192 | 12.873 | 1.170 | 4096 | 45056 | 5,50 |
|   | 12 | 1,50 | 8192 | 12.288 | 1.024 | 4096 | 49152 | 6,00 |
|   | 13 | 1,44 | 8192 | 11.833 | 910 | 4096 | 53248 | 6,50 |
|   | 14 | 1,40 | 8192 | 11.469 | 819 | 4096 | 57344 | 7,00 |
|   | 15 | 1,36 | 8192 | 11.171 | 745 | 4096 | 61440 | 7,50 |
|   | 16 | 1,33 | 8192 | 10.923 | 683 | 4096 | 65536 | 8,00 |

Fig. 10

| f | n | r | 520 | Tot. 600 | 700 | 700 4kB | Tot. 700 4kB | r 4kB |
|---|---|---|---|---|---|---|---|---|
| 4 | 5 | 5,00 | 32768 | 163.840 | 32.768 | 32768 | 163840 | 5,00 |
|   | 6 | 3,00 | 32768 | 98.304 | 16.384 | 16384 | 98304 | 3,00 |
|   | 7 | 2,33 | 32768 | 76.459 | 10.923 | 12288 | 86016 | 2,63 |
|   | 8 | 2,00 | 32768 | 65.536 | 8.192 | 8192 | 65536 | 2,00 |
|   | 9 | 1,80 | 32768 | 58.982 | 6.554 | 8192 | 73728 | 2,25 |
|   | 10 | 1,67 | 32768 | 54.613 | 5.461 | 8192 | 81920 | 2,50 |
|   | 11 | 1,57 | 32768 | 51.493 | 4.681 | 8192 | 90112 | 2,75 |
|   | 12 | 1,50 | 32768 | 49.152 | 4.096 | 4096 | 49152 | 1,50 |
|   | 13 | 1,44 | 32768 | 47.332 | 3.641 | 4096 | 53248 | 1,63 |
|   | 14 | 1,40 | 32768 | 45.875 | 3.277 | 4096 | 57344 | 1,75 |
|   | 15 | 1,36 | 32768 | 44.684 | 2.979 | 4096 | 61440 | 1,88 |
|   | 16 | 1,33 | 32768 | 43.691 | 2.731 | 4096 | 65536 | 2,00 |

Fig. 11

| f | n | r | 520 | Tot. 600 | 700 | 700 4kB | Tot. 700 4kB | r 4kB |
|---|---|---|---|---|---|---|---|---|
| 4 | 5 | 5,00 | 131072 | 655.360 | 131.072 | 131072 | 655360 | 5,00 |
|   | 6 | 3,00 | 131072 | 393.216 | 65.536 | 65536 | 393216 | 3,00 |
|   | 7 | 2,33 | 131072 | 305.835 | 43.691 | 45056 | 315392 | 2,41 |
|   | 8 | 2,00 | 131072 | 262.144 | 32.768 | 32768 | 262144 | 2,00 |
|   | 9 | 1,80 | 131072 | 235.930 | 26.214 | 28672 | 258048 | 1,97 |
|   | 10 | 1,67 | 131072 | 218.453 | 21.845 | 24576 | 245760 | 1,88 |
|   | 11 | 1,57 | 131072 | 205.970 | 18.725 | 20480 | 225280 | 1,72 |
|   | 12 | 1,50 | 131072 | 196.608 | 16.384 | 16384 | 196608 | 1,50 |
|   | 13 | 1,44 | 131072 | 189.326 | 14.564 | 16384 | 212992 | 1,63 |
|   | 14 | 1,40 | 131072 | 183.501 | 13.107 | 16384 | 229376 | 1,75 |
|   | 15 | 1,36 | 131072 | 178.735 | 11.916 | 12288 | 184320 | 1,41 |
|   | 16 | 1,33 | 131072 | 174.763 | 10.923 | 12288 | 196608 | 1,50 |

Fig. 12

| 512 | r 4kB | n |
|---|---|---|
| 1024 | 20,00 | 5 |
| 2048 | 10,00 | 5 |
| 3072 | 6,67 | 5 |
| 4096 | 5,00 | 5 |
| 5120 | 4,80 | 6 |
| 6144 | 4,00 | 6 |
| 7168 | 3,43 | 6 |
| 8192 | 3,00 | 6 |
| 9216 | 3,11 | 7 |
| 10240 | 2,80 | 7 |
| 11264 | 2,55 | 7 |
| 12288 | 2,33 | 7 |
| 13312 | 2,46 | 8 |
| 14336 | 2,29 | 8 |
| 15360 | 2,13 | 8 |
| 16384 | 2,00 | 8 |
| 17408 | 2,12 | 9 |
| 18432 | 2,00 | 9 |
| 19456 | 1,89 | 9 |
| 20480 | 1,80 | 9 |
| 21504 | 1,90 | 10 |
| 22528 | 1,82 | 10 |
| 23552 | 1,74 | 10 |
| 24576 | 1,67 | 10 |
| 25600 | 1,76 | 11 |
| 26624 | 1,69 | 11 |
| 27648 | 1,63 | 11 |
| 28672 | 1,57 | 11 |
| 29696 | 1,66 | 12 |
| 30720 | 1,60 | 12 |
| 31744 | 1,55 | 12 |
| 32768 | 1,50 | 12 |

...

| 33792 | 1,58 | 13 |
|---|---|---|
| 34816 | 1,53 | 13 |
| 35840 | 1,49 | 13 |
| 36864 | 1,44 | 13 |
| 37888 | 1,51 | 14 |
| 38912 | 1,47 | 14 |
| 39936 | 1,44 | 14 |
| 40960 | 1,40 | 14 |
| 41984 | 1,46 | 15 |
| 43008 | 1,43 | 15 |
| 44032 | 1,40 | 15 |
| 45056 | 1,36 | 15 |
| 46080 | 1,42 | 16 |
| 47104 | 1,39 | 16 |
| 48128 | 1,36 | 16 |
| 49152 | 1,33 | 16 |
| 50176 | 1,80 | 11 |
| 51200 | 1,76 | 11 |
| 52224 | 1,73 | 11 |
| 53248 | 1,69 | 11 |
| 54272 | 1,66 | 11 |
| 55296 | 1,63 | 11 |
| 56320 | 1,60 | 11 |
| 57344 | 1,57 | 11 |
| 58368 | 1,68 | 12 |
| 59392 | 1,66 | 12 |
| 60416 | 1,63 | 12 |
| 61440 | 1,60 | 12 |
| 62464 | 1,57 | 12 |
| 63488 | 1,55 | 12 |
| 64512 | 1,52 | 12 |
| 65536 | 1,50 | 12 |

...

| 761856 | 1,37 | 15 |
|---|---|---|
| 762880 | 1,37 | 15 |
| 763904 | 1,37 | 15 |
| 764928 | 1,37 | 15 |
| 765952 | 1,36 | 15 |
| 766976 | 1,37 | 16 |
| 768000 | 1,37 | 16 |
| 769024 | 1,36 | 16 |
| 770048 | 1,36 | 16 |

DISTRIBUTED OBJECT STORAGE SYSTEM COMPRISING PERFORMANCE OPTIMIZATIONS

CROSS REFERENCE TO RELATED APPLICATIONS

This application claims priority under 35 U.S.C. § 119 to corresponding co-pending EPO Application No. EP12190158.1 filed Oct. 26, 2012 and entitled "A Distributed Object Storage System Comprising Performance Optimizations," which is incorporated by reference herein in its entirety.

FIELD OF THE INVENTION

The present invention generally relates to a distributed data storage system. Typically, such distributed storage systems are targeted at storing large amounts of data, such as objects or files in a distributed and fault tolerant manner with a predetermined level of redundancy. The present invention relates more particularly to a distributed object storage system.

BACKGROUND OF THE INVENTION

The advantages of object storage systems, which store data objects referenced by an object identifier versus file systems, such as for example US2002/0078244, which store files referenced by an inode or block based systems which store data blocks referenced by a block address in terms of scalability and flexibility are well known. Object storage systems in this way are able to surpass the maximum limits for storage capacity of file systems in a flexible way such that for example storage capacity can be added or removed in function of the needs, without degrading its performance as the system grows. This makes such object storage systems excellent candidates for large scale storage systems.

Such large scale storage systems are required to distribute the stored data objects in the object storage system over multiple storage elements, such as for example hard disks, or multiple components such as storage nodes comprising a plurality of such storage elements. However as the number of storage elements in such a distributed object storage system increase, equally the probability of failure of one or more of these storage elements increases. To cope therewith it is required to introduce a level of redundancy into the distributed object storage system. This means that the distributed object storage system must be able to cope with a failure of one or more storage elements without data loss. In its simplest form redundancy is achieved by replication, this means storing multiple copies of a data object on multiple storage elements of the distributed object storage system. In this way when one of the storage elements storing a copy of the data object fails, this data object can still be recovered from another storage element holding a copy. Several schemes for replication are known in the art. In general replication is costly as the storage capacity is concerned. This means that in order to survive two concurrent failures of a storage element of a distributed object storage system, at least two replica copies for each data object are required, which results in storage capacity overhead of 200%, which means that for storing 1 GB of data objects a storage capacity of 3 GB is required. Another well-known scheme is referred to as RAID systems of which some implementations are more efficient than replication as storage capacity overhead is concerned. However, often RAID systems require a form of synchronisation of the different storage elements and require them to be of the same type and in the case of drive failure require immediate replacement, followed by a costly and time consuming rebuild process. Therefore known systems based on replication or known RAID systems are generally not configured to survive more than two concurrent storage element failures. Therefore it has been proposed to use distributed object storage systems that are based on erasure encoding, such as for example described in WO2009135630, US2007/0136525 or US2008/313241. Such a distributed object storage system stores the data object in encoded sub fragments that are spread amongst the storage elements in such a way that for example a concurrent failure of six storage elements out of minimum of sixteen storage elements can be tolerated with a corresponding storage overhead of 60%, that means that 1 GB of data objects only require a storage capacity of 1.6 GB.

Current erasure encoding based distributed object storage system for large scale data storage are well equipped to efficiently store and retrieve large data objects, however when small data objects need to be stored or retrieved, the storage cost of such systems starts to divert from the theoretical optimum, especially if small data objects need to be stored in large quantities.

Therefore there still exists a need for an improved distributed object storage system that is able to cope with small data objects in a more efficient manner.

SUMMARY OF THE INVENTION

According to a first aspect of the invention, there is provided a distributed object storage system which, comprises:
  a plurality of redundant storage elements, operable to store and retrieve a data object comprising a data object identifier in the form of a predetermined number of redundant sub fragments comprising said data object identifier, said predetermined number corresponding to a predetermined multiple of a desired spreading width, which consists of the sum of:
    a spreading requirement, corresponding to the number of storage elements that must store sub fragments of said data object and are not allowed to fail; supplemented with
    a maximal concurrent failures tolerance, corresponding to the number of storage elements that must store sub fragments of said data object and are allowed to fail concurrently;
  each one of said redundant sub fragments comprising:
    encoded data of equal size of the data object divided by a factor equal to said predetermined multiple of said spreading requirement; and
    decoding data, such that said data object can be decoded from any combination of said redundant sub fragments of which the number corresponds to predetermined multiple of said spreading requirement;
  a plurality of storage nodes each comprising a share of said plurality of redundant storage elements comprising a file system with a predetermined block size; and
  at least one controller node, operably connected to or comprised within said storage nodes when storing or retrieving said data object, comprising:
    an encoding module operable to disassemble said data object into at least said predetermined number of redundant sub fragments;
    a spreading module operable to store said predetermined number of said redundant sub fragments on a number of said storage elements being equal to said desired spreading width by storing one or more sub fragments (600) to be stored on a single storage element (300) into one or more sub fragment files (700) that are subsequently stored in the file system of this storage element (300);

a clustering module operable to retrieve at least said predetermined multiple of said spreading requirement of said redundant sub fragments from a plurality of said storage elements; and a decoding module operable to assemble said data object from any combination of said redundant sub fragments of which the number corresponds to said predetermined multiple of said spreading requirement, characterized that Said encoding module is further configured to:

Calculate for a plurality of predetermined values of said spreading requirement the cumulative size of said sub fragment files when stored on said file system with said predetermined block size; and Select as spreading requirement from said plurality of predetermined values a calculated value that is equal to one of said predetermined values for which said cumulative size is minimal.

This allows to optimize the real storage cost, especially for small data objects, by choosing a spreading requirement which differs from the theoretically optimal value.

According to a preferred embodiment said spreading module is configured to group all sub fragments to be stored on a single storage element into a single sub fragment file.

In this way the effect of the block size on the cumulative size of all sub fragment files is minimized.

According to a further embodiment said plurality of predetermined values is an incremental range of integer values ranging from a predetermined minimum value to a predetermined maximum value. Preferably said predetermined minimum value is one.

This allows to choose the most optimal value for the encoding process in all situations According to a preferred embodiment:

according to a first storage and retrieval option of said encoding module is configured to select as spreading requirement said maximum value; and according to a second storage and retrieval option of said distributed object storage system said encoding module is configured to calculate and select as spreading requirement said calculated value, said distributed object storage system being configured to be operated according to said first storage and retrieval option if the size of said data object is equal to or larger than a predetermined lower data object size threshold, and is configured to be operated according to said second storage and retrieval option if the size of said data object is smaller than said predetermined lower data object size threshold.

In this way the storage cost for a large number of small data objects related to the block size of the file system on the storage elements can be reduced while the overhead of the additional calculations is reduced for large data objects where the possible gain in storage cost is more limited.

Preferably said lower data object size threshold is determined in function of said block size of a file system in use on said storage elements.

This enables, optionally in an automated way, to determine the most efficient operating configuration for the specific elements in use in that distributed object storage system.

According to a further embodiment the distributed object storage system comprises a metadata storage comprising metadata of said data objects stored on said storage elements, said metadata comprising:

said data object identifier;

a list of identifiers of the storage elements on which sub fragments of said data object are stored.

According to an optional embodiment said metadata further comprises:

an identifier for said calculated value that was selected as spreading requirement by said encoding module for disassembling said data object into sub fragments.

Optionally said metadata further comprises an identifier for the type of storage and retrieval option that was used to store said data object.

This enables the clustering module and/or the decoding module to retrieve the data object in an efficient manner.

Alternatively said metadata storage comprises at least one metadata parameter for a plurality of said data objects.

When such a metadata parameter, such as for example a particular encoding parameter is the same for a plurality of the data objects, the metadata storage cost can be reduced by storing this metadata parameter only once instead of individually for each of the data objects.

According to a preferred embodiment said metadata further comprises the size of said data object and in that said metadata comprises as a metadata parameter an identifier for said predetermined lower data object size threshold, Said clustering module and/or said decoding module being configured to determine the type of storage and retrieval option that was used to store said data object, by comparing the size of said data object with said predetermined lower data object size threshold as both provided by said metadata.

In this way the clustering module and/or the decoding module to retrieve the data object in an efficient manner with minimal impact on the storage cost of the metadata.

According to a second aspect of the invention, there is provided a method for operating a distributed object storage system according to the first aspect of the invention, wherein said method comprises the steps of said encoding module:

Calculating for a plurality of predetermined values of said spreading requirement the cumulative size of said sub fragment files when stored on said file system with said predetermined block size; and Selecting as spreading requirement from said plurality of predetermined values a calculated value that is equal to one of said predetermined values for which said cumulative size is minimal.

According to a third aspect of the invention there is provided a computer program comprising software code adapted to perform the method according to the second aspect of the invention.

According to a fourth aspect of the invention there is provided a computer readable storage medium comprising the computer program according to the third aspect of the invention.

BRIEF DESCRIPTION OF THE DRAWINGS

FIGS. 7 to 18 schematically illustrate calculations for a second storage and retrieval operation according to the invention; and FIG. 19 schematically illustrates an embodiment according to the invention which makes use of a suitable combination of the first and second storage and retrieval operation.

DETAILED DESCRIPTION OF EMBODIMENT(S)

Figure 1:
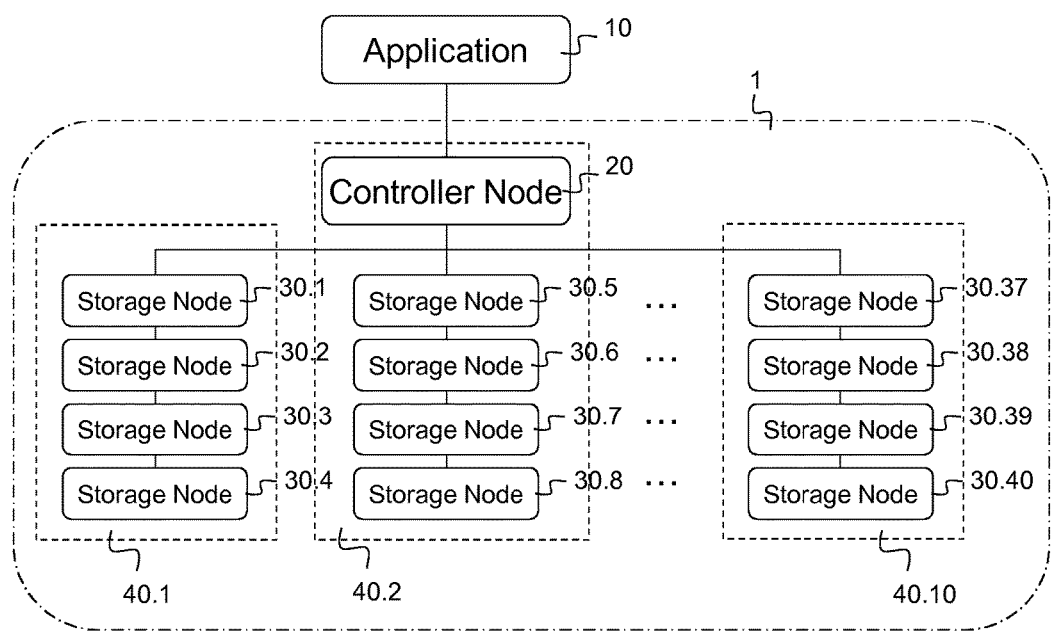
FIG. 1 illustrates a distributed object storage system according to the invention.

FIG. 1 shows a distributed object storage system 1 according to the invention. It is connected to an application 10 for transferring data objects. This connection could be implemented as a suitable data communication network. Such an application 10 could for example be a dedicated software application running on a computing device, such as a personal computer, a lap top, a wireless telephone, a personal digital assistant or any other type of communication device, that is able to interface directly with the distributed object storage system 1, but said application 10 could alternatively comprise a suitable file system which enables a general purpose software application to interface with the distributed object storage system 1 or an Application Programming Interface library. As further shown in FIG. 1 the distributed object storage system comprises a controller node 20 and a plurality of storage nodes 30.1-30.40 all interconnected in a suitable way for transferring data, for example by means of a conventional data communication network such as a local area network (LAN), a wide area network (WAN), a telephone network, such as the Public Switched Telephone Network (PSTN), an intranet, the internet, any other suitable network or combination of networks. Controller nodes 20, storage nodes 30 and the device comprising application 10 may connect to said data communication network by wired, wireless and/or optical connections.

According to alternative embodiments the distributed object storage system 1 could comprise any other suitable number of storage nodes 30 and for example two three or more controller nodes 20 also connected to these storage nodes 30. These controller nodes 20 and storage nodes 30 can be built as general purpose computers, however more frequently they are physically adapted for arrangement in large data centres, where they are arranged in modular racks 40 comprising standard dimensions. Particular controller nodes 20 and storage nodes 30, such as for example the Amplistor AS20 storage node as manufactured by Amplidata, are dimensioned to take up a single unit of such rack 40, which is generally referred to as 1U.

As shown in FIG. 1 several storage nodes 30 can be grouped together, for example because they are housed in a single rack 40. For example storage nodes 30.1-30.4; 30.5-30.8; . . . ; and 30.7-30.40 each are respectively grouped into racks 40.1, 40.2, . . . 40.10. Controller node 20 could for example be located in rack 40.2. These racks are not required to be located at the same location, they are often geographically dispersed across different data centres, such as for example rack 40.1-40.3 can be located at a data centre in Europe, 40.4-40.7 at a data centre in the USA and 40.8-40.10 at a data centre in China.

Figure 2:
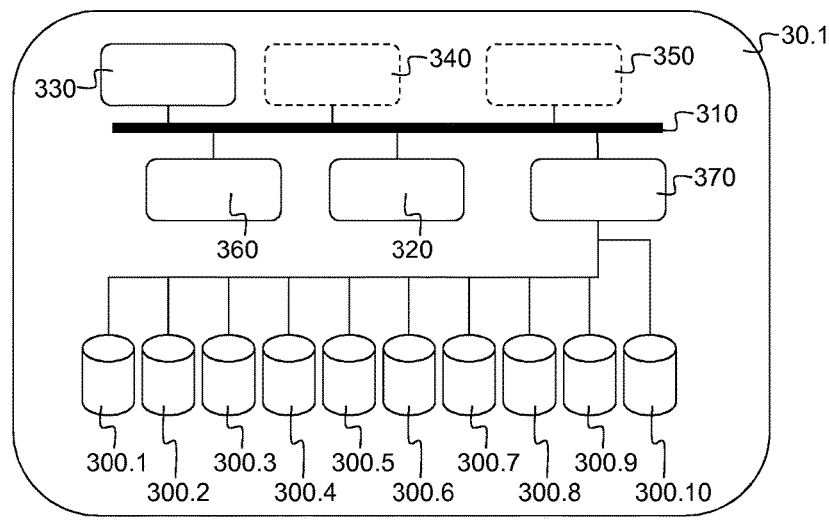
FIG. 2 schematically illustrates a storage node of the distributed object storage system of FIG. 1.

FIG. 2 shows a schematic representation of one of the storage nodes 30. Storage node 30.1 may comprise a bus 310, a processor 320, a local memory 330, one or more optional input units 340, one or more optional output units 350, a communication interface 360, a storage element interface 370 and a plurality of storage elements 300.1-300.10. Bus 310 may include one or more conductors that permit communication among the components of storage node 30.1. Processor 320 may include any type of conventional processor or microprocessor that interprets and executes instructions. Local memory 330 may include a random access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to said storage node 30.1, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 30.1 to communicate with other devices and/or systems, for example mechanisms for communicating with other storage nodes 30 or controller nodes 20 such as for example two 1 Gb Ethernet interfaces. Storage element interface 370 may comprise a storage interface such as for example a Serial Advanced Technology Attachment (SATA) interface or a Small Computer System Interface (SCSI) for connecting bus 310 to one or more storage elements 300, such as one or more local disks, for 2 TB SATA-II disk drives, and control the reading and writing of data to/from these storage elements 300. In one exemplary embodiment as shown in FIG. 2, such a storage node 30.1 could comprise ten 2 TB SATA-II disk drives as storage elements 300.1-300.10 and in this way storage node 30.1 would provide a storage capacity of 20 TB to the distributed object storage system 1. According to the exemplary embodiment of FIG. 1 and in the event that storage nodes 30.2-30.40 are identical to storage node 30.1, the distributed object storages system 1 would then have a total storage capacity of 800 TB.

Taking into account FIGS. 1 and 2 the distributed object storage system 1 comprises a plurality of redundant storage elements 300. The storage nodes 30 each comprise a share of these storage elements 300. As shown in FIG. 1 storage node 30.1 comprises ten storage elements 300.1-300.10. Other storage nodes 30 could comprise a similar amount of storage elements 300, but this is however not essential. Storage node 30.2 could for example comprise eight storage elements 300.11-300.18. As will be explained in further detail below with respect to FIGS. 5 and 6, the distributed object storages system 1 is operable to store and retrieve a data object 500 comprising data 520, for example 64 MB of binary data and a data object identifier 510 for addressing this data object 500, for example a universally unique identifier such as a globally unique identifier (GUID). Storing the data offered for storage by the application 10 in the form of a data object, also referred to as object storage, has specific advantages over other storage schemes such as conventional block based storage or conventional file based storage, such as scalability and flexibility, which are of particular importance in a distributed object storage system 1 that is directed to large scale redundant storage applications, sometimes also referred to as cloud storage.

The storage elements 300 are redundant and operate independently of one another. This means that if one particular storage element 300 fails its function can easily be taken on by another storage element 300 in the distributed storage system 1. However as will be explained in more detail further below, there is no need for the storage elements 300 to work in synchronism, as is for example the case in many well-known RAID configurations, which sometimes even require disc spindle rotation to be synchronised. Furthermore the independent and redundant operation of the storage elements 300 allows to use any suitable mix of types storage elements 300 to be used in a particular distributed object storage system 1. It is possible to use for example storage elements 300 with differing storage capacity, storage elements 300 of differing manufacturers, using different hardware technology such as for example conventional hard disks and solid state storage elements, using different storage interfaces such as for example different revisions of SATA, PATA and so on. All this results in specific advantages for scalability and flexibility of the distributed object storage system 1 as it allows to add or remove storage elements 300 without imposing specific requirements to their design in correlation to other storage elements 300 already in use in that distributed object storage system 1.

Figure 3:
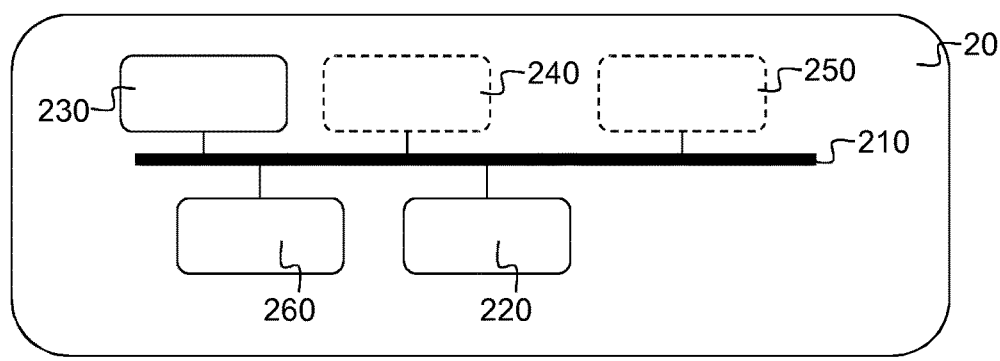
FIG. 3 schematically illustrates a controller node of the distributed object storage system of FIG. 1.

FIG. 3 shows a schematic representation of the controller nodes 20. Controller node 20 may comprise a bus 210, a processor 220, a local memory 230, one or more optional input units 240, one or more optional output units 250. Bus 210 may include one or more conductors that permit communication among the components of controller node 20. Processor 220 may include any type of conventional processor or microprocessor that interprets and executes instructions. Local memory 230 may include a random access memory (RAM) or another type of dynamic storage device that stores information and instructions for execution by processor 220 and/or a read only memory (ROM) or another type of static storage device that stores static information and instructions for use by processor 320 and/or any suitable storage element such as a hard disc or a solid state storage element. An optional input unit 240 may include one or more conventional mechanisms that permit an operator to input information to said controller node 20 such as a keyboard, a mouse, a pen, voice recognition and/or biometric mechanisms, etc. Optional output unit 250 may include one or more conventional mechanisms that output information to the operator, such as a display, a printer, a speaker, etc. Communication interface 260 may include any transceiver-like mechanism that enables controller node 20 to communicate with other devices and/or systems, for example mechanisms for communicating with other storage nodes 30 or controller nodes 20 such as for example two 10 Gb Ethernet interfaces.

According to an alternative embodiment the controller node 20 could have an identical design as a storage node 30, or according to still a further alternative embodiment one of the storage nodes 30 of the distributed object storage system could perform both the function of a controller node 20 and a storage node 30. According to still a further embodiment the device on which the application 10 runs is a controller node 30.

Figure 4:
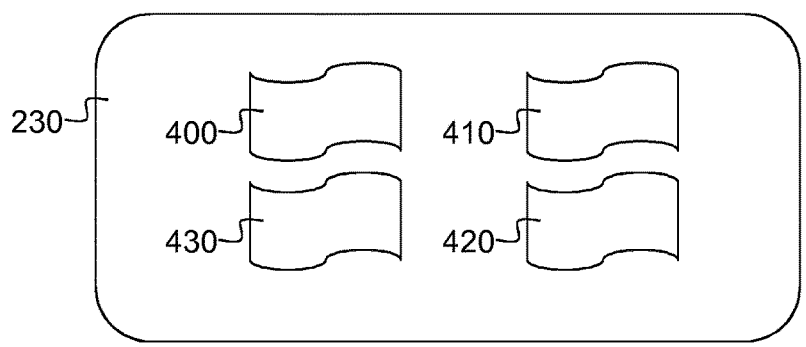
FIG. 4 schematically illustrates some elements of the controller node of FIG. 3 in more detail.

As schematically shown in FIG. 4, controller node 20 comprises four modules: an encoding module 400; a spreading module 410; a clustering module 420; and a decoding module 430. These modules 400, 410, 420, 430 can be implemented as programming instructions stored in local memory 230 of the controller node 20 for execution by its processor 220.

The functioning of these modules 400, 410, 420, 430 will now be explained to FIGS. 5 and 6. The distributed object storage system 1 stores a data object 500 offered by the application 10 in function of a reliability policy which guarantees a level of redundancy. That means that the distributed object storage system 1 must for example guarantee that it will be able to correctly retrieve data object 500 even if a number of storage elements 300 would be unavailable, for example because they are damaged or inaccessible. Such a reliability policy could for example require the distributed object storage system 1 to be able to retrieve the data object 500 in case of six concurrent failures of the storage elements 300 it comprises. In large scale data storage massive amounts of data are stored on storage elements 300 that are individually unreliable, as such redundancy must be introduced into the storage system to improve reliability. However the most commonly used form of redundancy, straightforward replication of the data on multiple storage elements 300 is only able to achieve acceptable levels of reliability at the cost of unacceptable levels of overhead. For example, in order to achieve sufficient redundancy to cope with six concurrent failures of storage elements 300, data objects 500 would need to be replicated six times and stored on redundant storage elements 300. This means that next to the master copy of a data object 500 stored on one storage element 300, six replica's must be stored on six other storage elements. As such storing 1 GB of data objects in this way would result in the need of 7 GB of storage capacity in a distributed object storage system, this means an increase in the storage cost by a factor of seven or an additional storage overhead of 600%. Therefore the distributed object storage system 1 according to the invention makes use of erasure coding techniques in order to achieve the requirements of the reliability policy with considerably less storage overhead. As will be explained in further detail below when using an erasure encoding with a rate of encoding r=10/16 six concurrent failures of storage element 300 can be tolerated, which only require a storage overhead of 60% or a storage cost by a factor of 1.6. This means that storing 1 GB of data objects in this way only results in the need of 1.6 GB of storage capacity in the distributed object storage system 1. Some erasure encoding techniques make use of Reed-Solomon codes, but also fountain codes or rateless erasure codes such as online codes, LDPC codes, raptor codes and numerous other coding schemes are available.

Figure 5:
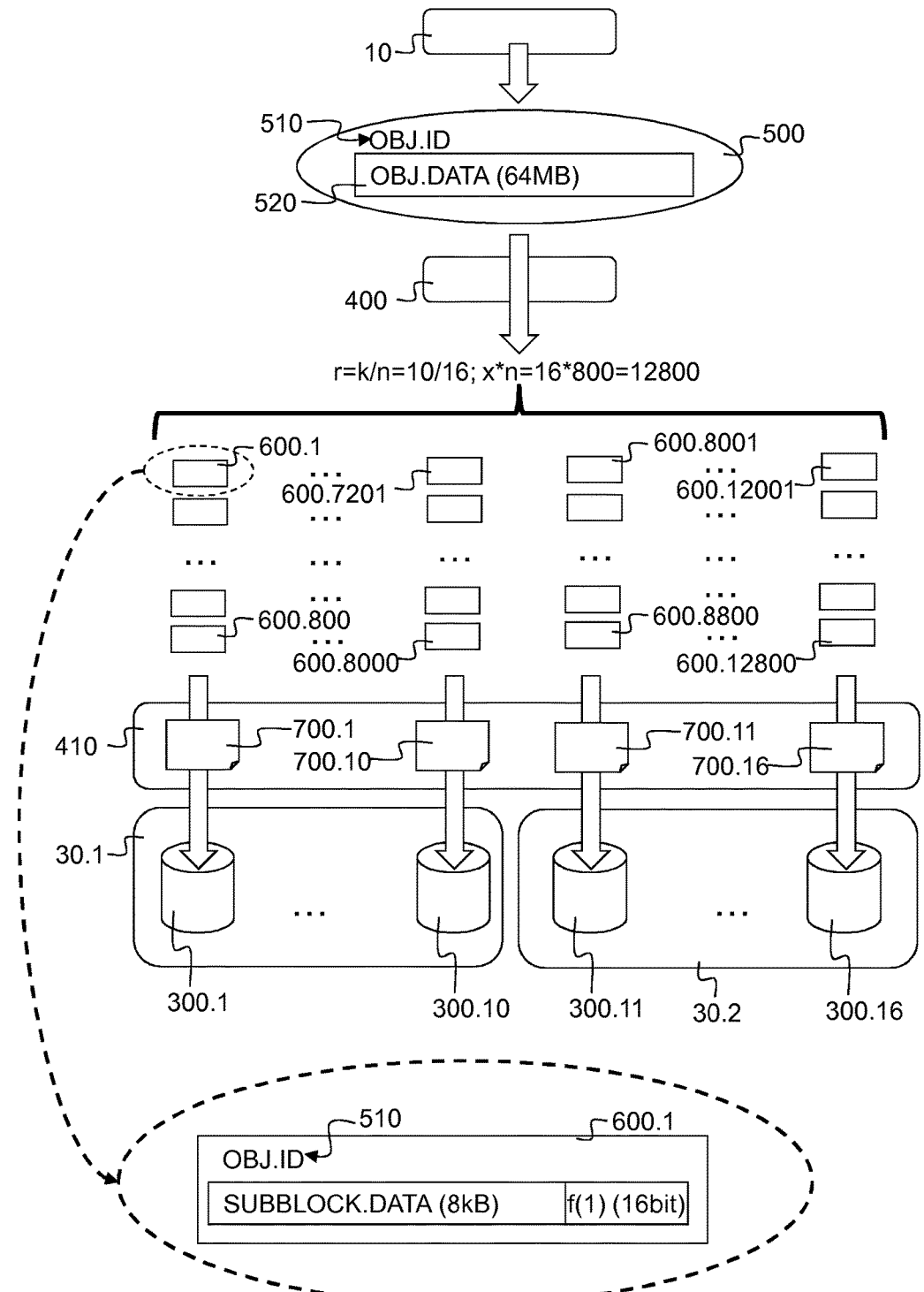
FIG. 5 schematically illustrates a storage operation according to the first option.

FIG. 5 shows a storage operation according to a first storage and retrieval option performed by an embodiment of the distributed object storage system 1 that is able to tolerate six concurrent failures of a storage element 300. The data object 500 is offered to the distributed object storage system 1 by the application 10 requesting a storage operation. In this embodiment the data object 500 comprises an object identifier 510, such as for example a GUID, and object data 520, for example consisting of 64 MB of binary data. This data object 500 is offered to the encoding module 400 of the controller node 20. The encoder module 400 will disassemble the data object 500 into a predetermined number x*n=16*800=12800 of redundant sub fragments 600, which also comprise the data object identifier 510. This predetermined number x*n=16*800=12800 corresponds to a predetermined multiple x=800 of a desired spreading width n=16. This desired spreading width n=16=k+f=10+6 consists of the sum of a spreading requirement k=10 and a maximal concurrent failures tolerance f=6. This maximal concurrent failures tolerance f=6 corresponds to the number of storage elements 300 that store sub fragments 600 of said data object 500 and are allowed to fail concurrently as determined by the reliability policy. The spreading requirement k=10, corresponds to the number of storage elements 300 that must store sub fragments 600 of said data object 500 and are not allowed to fail. The encoder module 400 makes use of an erasure encoding scheme to produce these predetermined number x*n=16*800=12800 redundant sub fragments 600.1-600.12800. In this way each one of these redundant sub fragments 600, such as for example sub fragment 600.1 comprises encoded data of equal size of the data object 500 divided by a factor equal to said predetermined multiple of said spreading requirement x*k=800*10=8000. This means that the size of sub fragment 600.1 in the example above with a data object of 64 MB will be 8 kB, as this corresponds to 64 MB divided by x*k=800*10=8000. Sub fragment 600.1 will further comprise decoding data f(1), such that said data object 500 can be decoded from any combination of said redundant sub fragments 600 of which the number x*k=800*10=8000 corresponds to said predetermined multiple x=800 of said spreading requirement k=10. To accomplish this the encoder module 400 will preferably make use of an erasure encoding scheme with a rate of encoding r=k/n=10/16 which corresponds to the spreading requirement k=10 divided by the desired spreading width n=16. In practice this means that the encoder module 400 will first split the data object 500 of 64 MB into x*k=800*10=8000 chunks of 8 kB, subsequently using an erasure encoding scheme with a rate of encoding of r=k/n=10/16 it will generate x*n=800*16=12800 encoded redundant sub fragments 600.1-600.12800 which comprise 8 kB of encoded data, this means encoded data of a size that is equal to the 8 kB chunks; and decoding data f(1)-f(12800) that allows for decoding. The decoding data could be implemented as for example be a 16 bit header or another small size parameter associated with the sub fragment 600, such as for example a suitable sub fragment identifier. Because of the erasure encoding scheme used, namely a rate of encoding r=k/n=10/16, the sub fragments 600.1-600.12800 allow the data object 500 to be decoded from any combination of sub fragments 600 which corresponds to the predetermined multiple of the spreading requirement x*k=800*10=8000, such as for example the combination of sub fragments 600.1-600.4000 and sub fragments 600.8001-600.12000. The storage cost of such an erasure coding scheme is inversely proportional to the rate of encoding and in this particular embodiment will be a factor of 1/r=1/(10/16)=1.6. This means that according to this embodiment of the distributed object storage system 1 of the invention 1 GB of data objects 500 will result in a need for a storage capacity of 1.6 GB.

Subsequently, as shown in FIG. 5, the spreading module 410 will store the predetermined number x*n=800*16=12800 of encoded redundant sub fragments 600.1-600.12800 on a number of storage elements 300 which corresponds to said desired spreading width n=16, such as for example storage elements 300.1-300.16. The spreading module 410 will store on each of these storage elements 300.1-300.16 said predetermined multiple x=800 of these sub fragments 600. As shown in FIG. 5 sub fragments 600.1-600.800 are stored on storage element 300.1, the next x=800 of these sub fragments are stored on storage element 300.2 and so on until the last x=800 of these sub fragments 12001-12800 are stored on storage element 300.16. According to an embodiment, the storage elements 300 comprise a suitable file system in which the sub fragments 600 are stored by the spreading module 410 in the form of sub fragment files 700. Preferably the spreading module 410 groups all sub fragments 600 that need to be stored on a single storage element 300 into a single sub fragment file 700 that is subsequently stored in the file system that is in use on the respective storage element 300. For the embodiment shown in FIG. 5 this would mean that the sub fragments 600.1-600.800 which need to be stored on the storage element 300.1 would be grouped in a single sub fragment file 700.1 by the spreading module 410. This sub fragment file 700.1 then being stored in the file system of storage element 300.1. As shown in FIG. 5 storage elements 300.1-300.10 are arranged in storage node 30.1 and storage elements 300.11-300.16 are arranged in storage node 30.2.

Although alternative methods for determining the share of sub fragments to be stored on specific storage elements 300 are well known to the person skilled in the art and are for example described in WO2009135630 it is generally preferable to configure the spreading module 410 to store an equal share of the total amount of sub fragments 600 on each of the storage elements 300 selected for storage. This allows for a simple configuration of the spreading module 410 which then for example generates a sub fragment file 700 for storage on each of the storage elements 300 selected that will comprise an equal share of the total amount of sub fragments 600 and will thus also be equal in size. In the example as shown in FIG. 5 this would result in 16 sub fragment files 700.1-700.16 each comprising 800 sub fragments 600 and each sub fragment file 700 would have a size 6400 kB as it comprise 800 times 8 kB of sub fragment data 510.

It is clear that according to alternative embodiments of the invention other values could have been chosen for the parameters x, f, k, n=k+f and r=k/n mentioned in embodiment above, such as for example x=400, f=4, k=12; n=k+f=12+4=16 and r=12/16; or any other possible combination that conforms to a desired reliability policy for redundancy and concurrent failure tolerance of storage elements 300 of the distributed object storage system 1.

According to still a further alternative there could be provided a safety margin to the number of concurrent failures f that a distributed object storage system 1 needs to be able to cope with. In such an embodiment some of the efficiency is traded in for some additional redundancy over what is theoretically required. This preventively increases the tolerance for failures and the time window that is available for a repair activity. However according to a preferred embodiment this safety margin will be rather limited such that it only accounts for an increase in sub fragments that must be generated and stored of for example approximately 10% to 30%, such as for example 20%.

Figure 6:
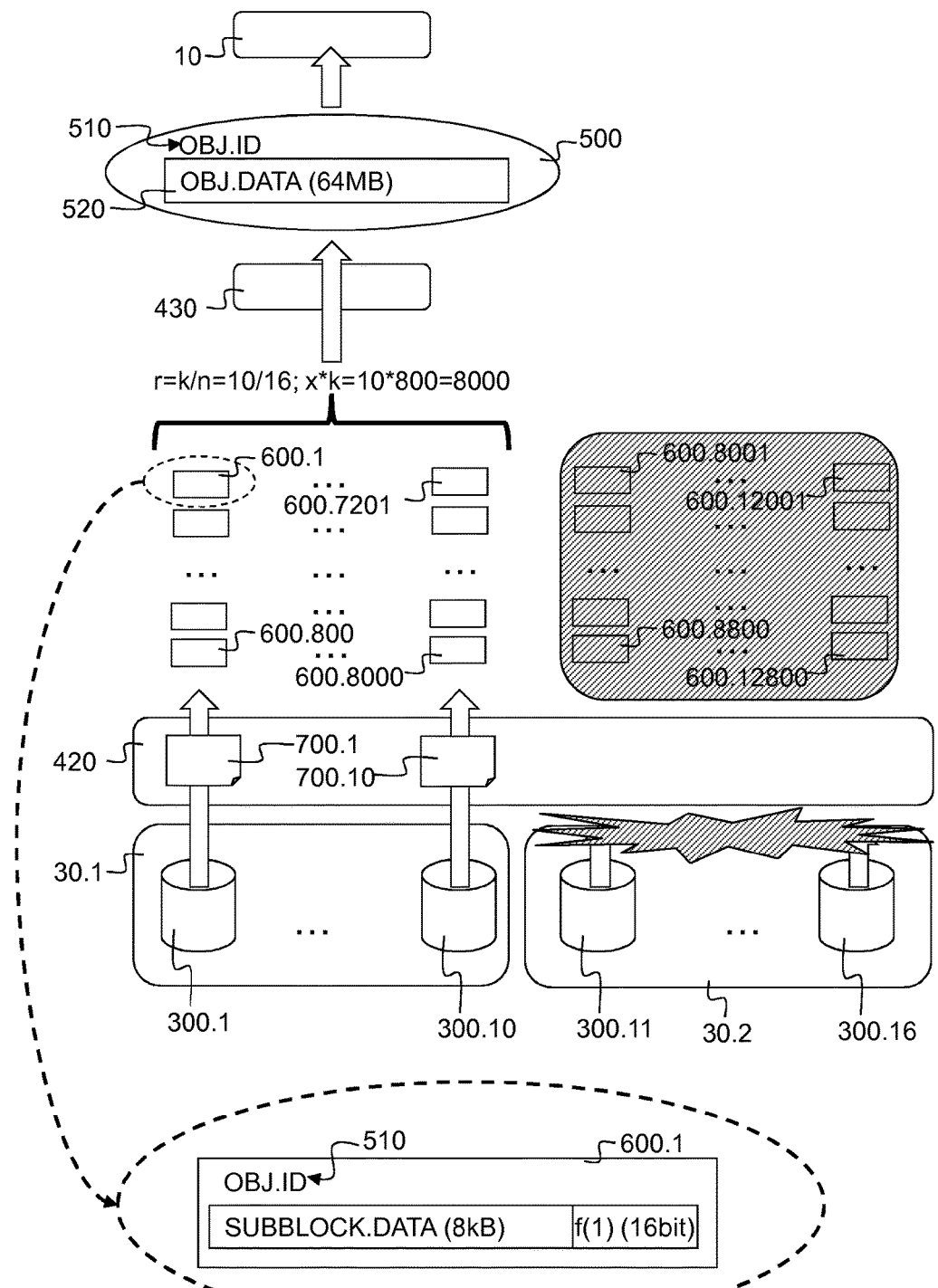
FIG. 6 schematically illustrates a retrieval operation according to the first option.

FIG. 6 shows the corresponding retrieval operation according to this first storage and retrieval option performed by the embodiment of the distributed object storage system 1 as described for the storage operation of FIG. 5 that is able to tolerate six concurrent failures of a storage element 300. The data object 500 is requested from the distributed object storage system 1 by the application 10 requesting a retrieval operation. As explained above, in this embodiment the requested data object 500 can be addressed by its object identifier 510. In response to this request for a retrieval operation the clustering module 420 of the controller node 20 will initiate the retrieval of the sub fragments 600 associated with this data object identifier. It will try to retrieve the predetermined number x*n=16*800=12800 of redundant sub fragments 600.1-600.12800 from the sub fragment files 700.1-700.16 that were stored on the storage elements 300.1-300.16. Because of the encoding technology used and the corresponding decoding techniques available, it is sufficient for the clustering module 420, to retrieve said predetermined multiple of said spreading requirement x*k=800*10=8000 of said redundant sub fragments 600 from these storage elements 300.1-300.16. This could be the case when for example there is a problem in network connectivity between the controller node 20 and storage node 30.2 as indicated in FIG. 6. In that case the retrieval operation of the clustering module will be able to retrieve the sub fragments 600.1-600.8000 which corresponds to said predetermined multiple of said spreading requirement x*k=800*10=8000. The retrieved sub blocks 600.1-600.8000 allow the decoding module 430 to assemble data object 500 and offer it to the application 10. It is clear that any number in any combination of the redundant sub fragments 600 corresponding to said data object 500, as long as their number is equal to or larger than the predetermined multiple of the spreading requirement x*k=800*10=8000, would have enabled the decoding module 430 to assemble the data object 500.

The first storage and retrieval option as described above is optimal for storing large data objects such as for example multimedia files containing audio and/or video content, which have a size of several Megabytes up to several Gigabytes. However when applying this distributed encoding and decoding scheme to smaller data objects, especially when a large number of these smaller data objects needs to be stored or retrieved, there exists the risk that the storage cost will start to rise because of the technical limitations of the file system operating on the storage elements 300 on which the distributed object storage system 1 stores the sub fragments 600. Such a block size impacts the space taken up in the file system operating on the storage elements 300 by the sub fragment files 700 comprising a sub fragment 600 or group of sub fragments 600. For example if the size of such a sub fragment file 700 comprising one or more sub fragments 600 stored on the storage elements 300 is 3 kB and the block size of the low level file system operating on the storage elements 300 is 4 kB, then it is clear that storing the 3 kB sub fragment file 700 will still occupy a single block size, and thus take up 4 kB of space of the storage capacity of the storage element 300, resulting in an additional storage cost.

Because the storage cost of an erasure coding scheme, as explained above, is inversely proportional to the rate of encoding 1/r=1/(k/n)=n/k=(k+f)/k=1+f/k it is in general advantageous for a given concurrent failure tolerance f, for example f=4, to choose spreading requirement as large as possible in order to reduce the storage cost as far as possible, because when the spreading requirement k=12 this will result in a theoretical storage cost of 1+4/12=1.33 . . . as explained above, which is more advantageous than when the spreading requirement k=6 which results in a storage cost of 1+4/6=1.66 . . . . This means that in the case of the spreading requirement being k=12, 1 GB of data objects 500 will result in a need for a theoretical storage capacity of 1.33 GB; while in the case of the spreading requirement being k=6 it will result in a need for a theoretical storage capacity of 1.66 GB. However when taking into account the effect of the block size of the file system operating on the storage elements 300, as explained above, a higher spreading requirement could still result in an additional storage cost if the spreading module 410 generates sub fragment files 700 of which the size diverts from an integer multiple of this block size. The negative impact of the effect of the block size on the storage cost increases when the size of the object data 520 and thus the corresponding sub fragment files 700 to be stored on the storage elements 300 are relatively small. As will be clear from the examples as described in FIGS. 7-18, this for example means that for a file system comprising a block size of 4 kB, the negative impact will be already relevant for data objects smaller than 128 kB, for an encoding scheme with a spreading requirement k=12 and a maximum concurrent failure tolerance f=4, it becomes a critical issue for data objects smaller than 64 kB and certainly for data objects with a size of less than ten times the block size of 4 kB.

Therefore in such a case, according to the invention it is proposed to store data objects 500 according to a second storage and retrieval option such that the additional storage cost generated by the effect of the block size decreases, without affecting the concurrent failure tolerance f. This second storage and retrieval option will be explained by means of an exemplary embodiment as shown in FIGS. 7-18. It concerns an embodiment in which the encoding scheme comprises a maximum concurrent failure tolerance f=4 and where a file system with a block size of 4 kB or 4096 B is in use on the storage elements 300 of the distributed object storage system 1.

As shown in FIG. 7, for a data object 500 comprising object data 520 with a size of 3 kB or 3072 B. When it would be stored according to the first storage and retrieval option as described above with a concurrent failure tolerance f=4 and a spreading requirement k=12, which corresponds to a desired spreading width of n=16. The size of the corresponding predetermined number x*n=16*n of sub fragments 600 that would be generated by the encoding module 410, corresponds to the size of the object data 520 multiplied by the inverse of the encoding rate 1/r=l+f/k. This means that the total size of all sub fragments 600 would be 3072 B*(1+4/12)=3072 B*1.33=4096 B. According to this embodiment the spreading module 410 is configured to store an equal share of sub fragments 600 in a single sub fragment file 700 on each of the selected storage elements 300. This means in this case that for a desired spreading width of n=16 that the size of each of the 16 sub fragment files 700 would be 4096 B/16=256 B. However when stored in the file system in use on the respective storage elements 300 with a sub fragment size of 4096 B the sub fragment files 700 would in reality each consume a single sub fragment of 4096 B of the storage element. The real size of the stored sub fragment file 700 on such a file system with a block size of 4 kB thus being 4096 B. The total storage consumed for storing the 16 sub fragment files on the storage elements 300 with 4 kB block size file system thus being 16*4096 B=65536 B. Instead of the theoretical storage cost 1/r=1.33 the real storage cost for storage in an 4 kB block size file system is this total storage consumed of 65536 B divided by the object data 520 size of 3072 B: 1/r(4 kB)=65536 B/3072 B=21.33, which is clearly higher than the theoretical storage cost 1/r of 1.33. All calculations made above are made visible in the bottom row of the table shown in FIG. 7 in which for the concurrent failure tolerance f=4, the case of a desired spreading width of n=16, which corresponds to a spreading requirement of k=12, is shown. Subsequently the corresponding theoretical storage cost is shown in the column with heading "1/r", the object data size in column "520", the total size of all sub fragments 600 in column "Tot. 600", the size of a single sub fragment file 700 in column "700", the size of a single sub fragment file 700 when stored in a 4 kB block size file system in use on a storage element 300 in column "700 4 kB", the size of all sub fragment files 700 when stored in such a file system in column "Tot. 700 4 kB" and finally the real storage cost for a system with such a file system in column "1/r(4 kB)".

When now, as shown in the row above, the same calculations are performed for a desired spreading width n=15, which corresponds to a spreading requirement k=11. Again the size of the corresponding predetermined number x*n=16*n of sub fragments 600 that would be generated by the encoding module 410, corresponds to the size of the object data 520 multiplied by the inverse of the encoding rate 1/r=1+f/k. This means that the total size of all sub fragments 600 would be 3072 B*(1+4/11)=3072 B*1.36=4189 B. This means in this case that for a desired spreading width of n=15 that the size of each of the 15 equally sized sub fragment files 700 would be 4189 B/15=279 B. However when stored in the file system in use on the respective storage elements 300 with a sub fragment size of 4096 B the sub fragment files 700 would in reality each consume a single sub fragment of 4096 B of the storage element. The real size of the stored sub fragment file 700 on such a file system with a block size of 4 kB thus being 4096 B. The total storage consumed for storing the 15 sub fragment files 700 on the storage elements 300 with 4 kB block size file system thus being 15*4096 B=61440 B. Instead of the theoretical storage cost 1/r=1.36 the real storage cost for storage in an 4 kB block size file system is this total storage consumed of 61440 B divided by the object data 520 size of 3072 B: 1/r(4 kB)=61440 B/3072 B=20.00, which is clearly higher than the theoretical storage cost 1/r of 1.36. However although the theoretical storage cost 1/r=1.33 for the for a desired spreading width n=16 is lower than the theoretical storage cost 1/r=1.36 for a desired spreading width n=15, the opposite is true for the real storage cost 1/r(4 kB)=21.33 that for the desired spreading width n=16 is higher than the real storage cost 1/r(4 kB)=20.00 for the desired spreading width n=15.

When now the same calculations are also performed for a desired spreading width ranging from 5 to 14, corresponding to a spreading requirement ranging from 1 to 10, as was also the case in the above calculations, the encoding scheme in all these scenario's has a maximum concurrent failure tolerance of f=4. From the calculations as presented in the table shown in FIG. 7 it is clear that the real storage cost 1/r(4 kB)=6.67 is the lowest for a desired spreading width n=5, which corresponds to a spreading requirement k=1.

The encoding module 400 is able to make all calculations as displayed in the table of FIG. 7. This means that the encoding module 400 calculates for a plurality of predetermined values of the spreading requirement the cumulative size of said sub fragment files 700 when stored on the file system with the predetermined block size. After such a calculation the encoding module 400 will be able to automatically select as spreading requirement from this plurality of predetermined values a calculated value that is equal to one of these predetermined values for which said cumulative size is minimal. It is clear from the table as shown in FIG. 7 that as starting point for the calculations, instead of a plurality of predetermined values of the spreading requirement k, it is alternatively possible to use a plurality of predetermined values of the desired spreading width n, or any other suitable values from which the spreading requirement k can be calculated. It is equally clear that to enable the selection an alternative value can be used instead of the cumulative size of the sub fragment files 700, such as for example the real storage cost 1/r(4 kB) or any other suitable value from which the cumulative size of the sub fragment files 700 can be calculated.

FIG. 8 shows the equivalent calculations as performed in FIG. 7, but now for a data object 500 comprising object data 520 with a size of 4096 B or 4 kB. It is clear that also in this case the real storage cost 1/r(4 kB)=5.00 is the lowest for a desired spreading width n=5, which corresponds to a spreading requirement k=1.

FIG. 9 shows the equivalent calculations as performed in FIG. 7, but now for object data 520 with a size of 5120 B or 5 kB. It is clear that in this case the real storage cost 1/r(4 kB)=4.80 is the lowest for a desired spreading width n=6, which corresponds to a spreading requirement k=2.

FIG. 10 shows the equivalent calculations as performed in FIG. 7, but now for object data 520 with a size of 8192 B or 8 kB. It is clear that in this case the real storage cost 1/r(4 kB)=3.00 is the lowest for a desired spreading width n=6, which corresponds to a spreading requirement k=2.

FIG. 11 shows the equivalent calculations as performed in FIG. 7, but now for object data 520 with a size of 32768 B or 32 kB. It is clear that in this case the real storage cost 1/r(4 kB)=1.50 is the lowest for a desired spreading width n=12, which corresponds to a spreading requirement k=8.

FIG. 12 shows the equivalent calculations as performed in FIG. 7, but now for object data 520 with a size of 131072 B or 128 kB. It is clear that in this case the real storage cost 1/r(4 kB)=1.41 is the lowest for a desired spreading width n=15, which corresponds to a spreading requirement k=11.

Figure 13:
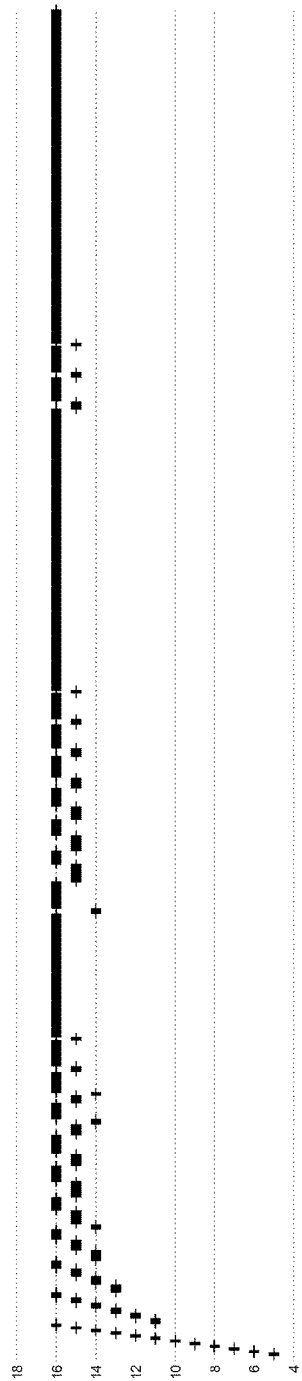
Figure 14:
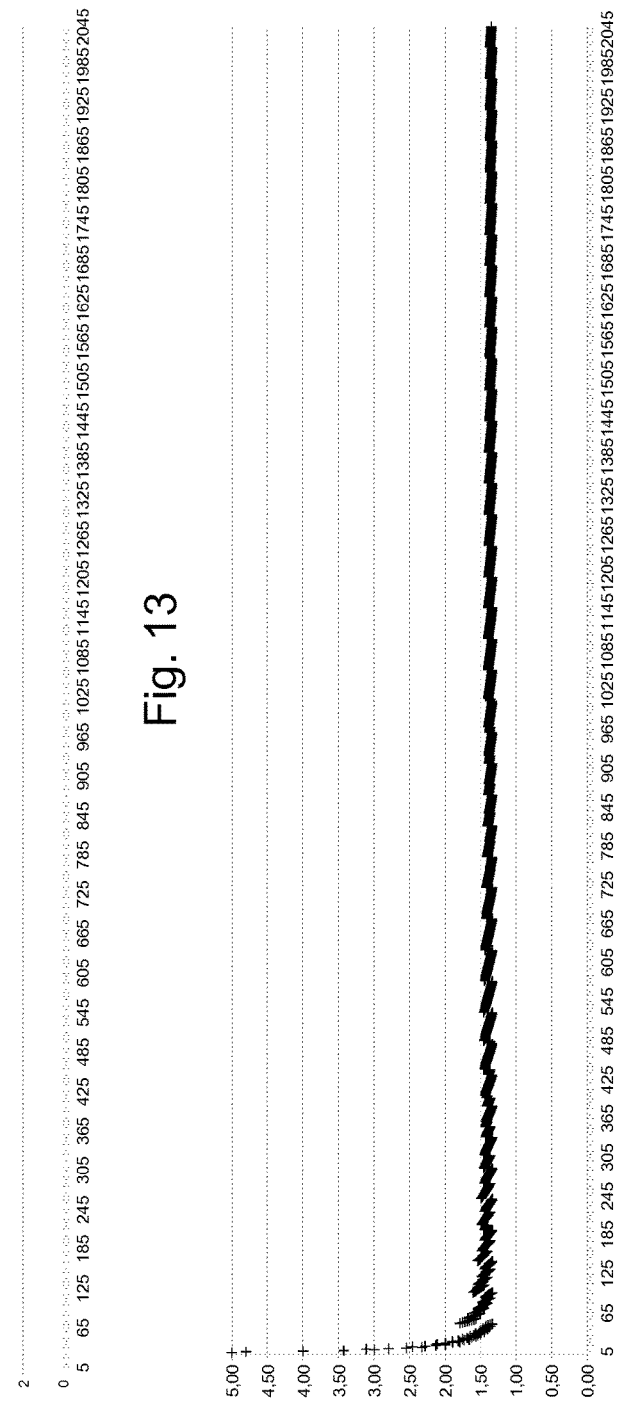

FIG. 13 graphically indicates on the vertical axis the desired spreading width n for which the real storage cost 1/r(4 kB) is the lowest as a result of performing calculations as in FIG. 7 for object data sizes 520 ranging from 4 kB to 2048 kB in increments of 1 kB as indicated on the horizontal axis. FIG. 14 which correlates to FIG. 13 shows for the same horizontal axis an indication of the real storage cost 1/r(4 kB) as indicated on the vertical axis. It is clear from FIG. 13 that for the plurality of predetermined values of the spreading requirement k, which in the embodiment described, is an incremental range of integer values ranging from a predetermined minimum value of 1 to a predetermined maximum value of 12, which corresponds with a plurality of values for the desired spreading width n ranging from 5 to 16, the calculated value that corresponds to the lowest real storage cost 1/r(4 kB) for the lowest values of the object data size 520, most frequently differs from the highest value for the desired spreading width of 16 or the spreading requirement of 12, which corresponds with the lowest theoretical storage cost 1/r of 1.33. For object data 520 with a size of over 1024 kB the calculated predetermined spreading width n only seldom differs from the maximum value of n=16, and when it differs from this maximum value of n=16, it does differ only a little with values for the desired spreading width such as for example n=15. For this object data 520 sizes also the real storage cost 1/r(4 k) starts to align with the lowest theoretical storage cost 1/r of 1.33.

Figure 15:
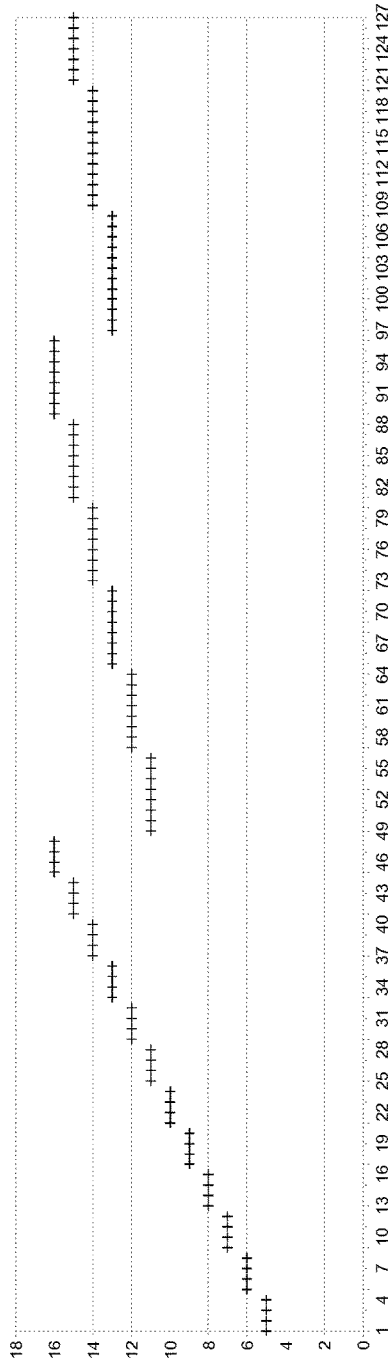
Figure 16:
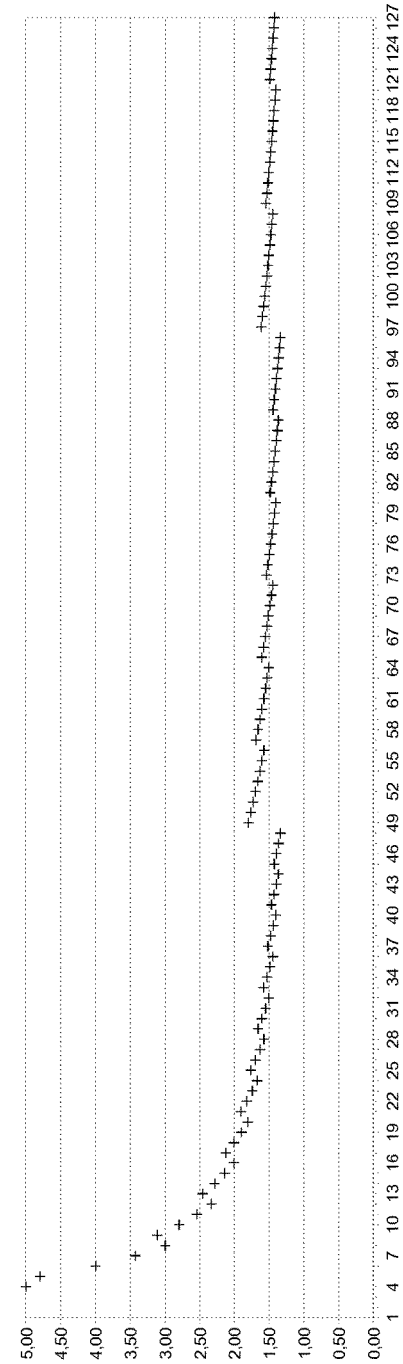
Figures 18, 19:
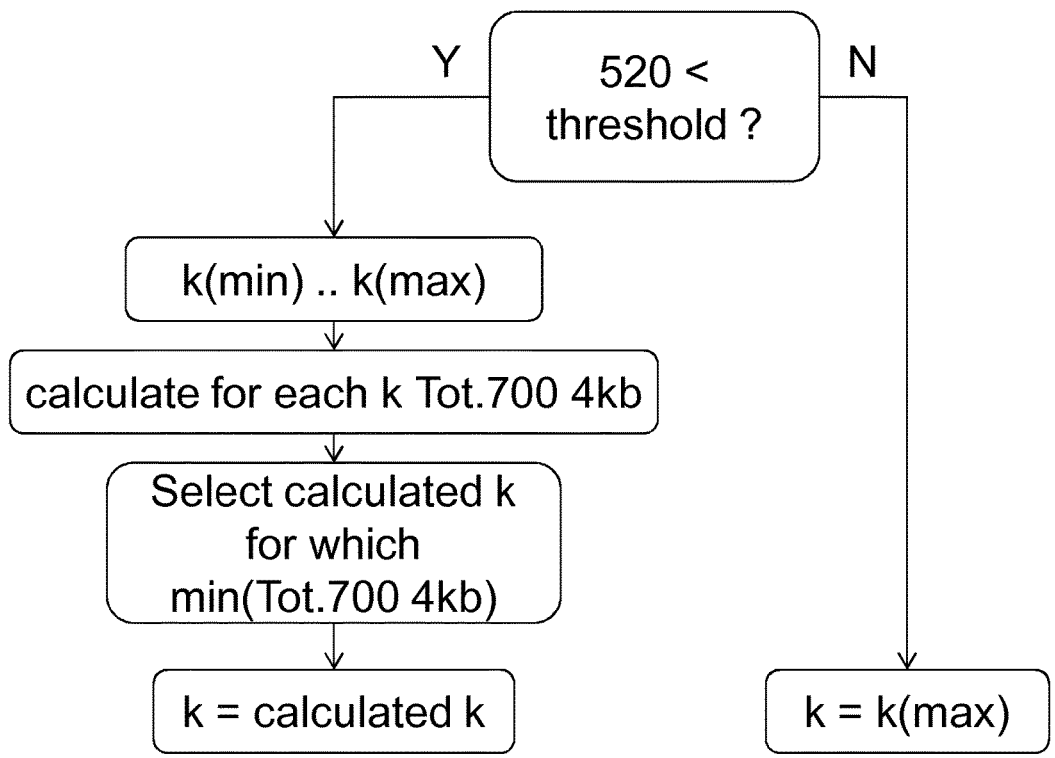

FIGS. 15 and 16 show a fragment of FIGS. 13 and 14 respectively for object data 520 sizes of up to 127 kB. It shows in more detail the frequent changes in the calculated predetermined spreading width and the associated real storage cost 1/r(4 kB). Although according to an embodiment of the invention all data objects 500 could be stored according to the second storage and retrieval option, it is clear that for the smaller object data 520 sizes the advantageous effect is larger. In order to reduce the number of calculations that need to be performed by the encoding module 400, according to an alternative embodiment as shown in FIG. 19, the distributed object storage system 1 can automatically decide whether to store a data object 500 according to the second storage and retrieval option if the size of the object data 520 is smaller than a predetermined lower data object size threshold or according to the first storage and retrieval option if the size of the object data 520 is equal to or larger than said predetermined lower data object size threshold. This predetermined lower data object size threshold could be a value set by an operator, for example in the embodiment described above it could for example be set to 1 MB or 256 kB or 128 kB or 64 kB however any other suitable value could be chosen. Preferably however the lower data object size threshold will be chosen in function of the block size of the file system in use on said storage elements 300, optionally in combination with the encoding parameters such as for example the maximum concurrent failure tolerance f. In that case the lower data object size threshold could be chosen as a predetermined multiple of the block size, which in the embodiment above was 4 kB, so for example 10, 20 or 100 times the block size or any other suitable multiple, or a predetermined multiple of the product of the block size and the maximum value of the spreading requirement, which in the embodiment described above was 4 kB*12=48 kB for example 1, 2, 3, 10 or any other suitable multiple of this product.

FIG. 17 shows in more detail the values displayed in FIGS. 15 and 16 for object data 520 sizes ranging from 1024 B up to 65536 B in increments of 1 kB, the real storage cost 1/r(4 kB) and the calculated value for the desired spreading width. It further also shows these values for a few object data 520 sizes around 764928 B or 747 kB. It is clear that for these object data 520 sizes the real storage cost 1/r(4 kB) of 1.36 or 1.37 closely aligns with the theoretical optimum storage cost 1/r of 1.33. And as further shown in FIG. 18, which shows the equivalent calculations as performed in FIG. 7, but now for object data 520 with a size of 764928 B or 747 kB, although the cumulative size of the sub fragment files 700 when stored in the 4 kB file system is still slightly lower for a desired spreading width of n=15 with respect to a desired spreading width of n=16, the relative difference as expressed in the real storage cost 1/r(4 kB) becomes negligible as in both these cases 1/r(4 kB) equals 1.37. Therefore the benefit in storage cost that can be realised with the second storage and retrieval operation can be put in the balance with the need to perform additional calculations for these larger object data 520 sizes and there can be chosen for an operation according to the embodiment described with reference to FIG. 19

In addition to the improvements related to storage cost the calculated value for the spreading requirement, when it is smaller than the maximum value of the range, also leads to performance improvements during storage and retrieval of the data objects 500. The reduced spreading requirement namely reduces the number of storage elements 300 that must be accessed by the spreading module 410 and/or the clustering module 420 during a storage and retrieval operation. This is especially relevant when a large number of small data objects 500 need to be accessed frequently, for example during frequent retrieval operations. Although for large data objects 500 it is beneficial to access as much storage elements 300 in parallel as possible during a storage and/or retrieval operation because in that case the data transfer rate of all these storage elements 300 can be cumulated. In the context of storage and/or retrieval operations of a large number of smaller data objects 500 for each of these operations the response time of each of the storage elements 300 that needs to be accessed will accumulate and will start to form a performance limitation. Therefore a reduced spreading requirement will enable these small data object 500 to be retrieved from sub fragments 600 by accessing a reduced number of storage elements 300.

It is clear that according to alternative embodiments there could be a file system in use on the storage elements 300 with a block size other than 4 kB. According to still further alternative embodiments the plurality of predetermined values for the spreading requirement or the desired spreading width does not have to be an incremental range of integer values ranging from a predetermined minimum value to a predetermined maximum value, and the minimum value for the spreading requirement should not be one. In the embodiments described above the range of values for the spreading requirement k=1 to 12 or the desired spreading width n=5 to 16, could equally be any other suitable plurality of values, such as for example k={8, 9, 10, 11, 12} or for example n={8, 10, 12, 14, 16} or any other suitable plurality of values. It is further also clear, that although grouping all sub fragments 600 to be stored on a single storage element 300 into a single sub fragment file 700 is in most cases optimal with regard to the real storage cost of each of the sub fragment files 700 when stored in the file system as it minimizes the negative effect of the block size, according to alternative embodiments, the sub fragments to be stored on a single storage element 300 could be grouped in any suitable plurality of sub fragment files 700.

Preferably the distributed object storage system 1 comprises a metadata storage comprising metadata of the data objects 500 stored on the storage elements 300. This metadata could be a suitable programming structure implemented in the memory of the controller node 20. During a storage operation the encoding module 400 and/or the spreading module 410 add for every data object 500 they store a respective entry for its data object identifier 510, a list of identifiers of the storage elements 300 on which sub fragments 600 of the data object 500 are stored, an identifier for the calculated value that was selected as spreading requirement by the encoding module 400 for disassembling the data object 500 into sub fragments 600, and optionally the type of storage and retrieval option that was used to store said data object 500. This then enables the clustering module 420 and the decoding module 430 to determine the most efficient way for retrieving a data object 500 during a retrieval operation.

According to a further alternative the metadata could store a parameter for a plurality of data objects 500 from which the type of storage and retrieval option can then be derived. This could for example be a system wide parameter that sets the predetermined lower data object size threshold for switching between the first and the second storage and retrieval option. According to this embodiment the metadata of the data object 500 comprises the size of the data object 500, which then suffices to derive the type of storage and retrieval by comparing this data object size with the parameter representing the predetermined lower data object size threshold.

According to still a further alternative embodiment another parameter that could be stored in the metadata for a plurality of data objects 500 is for example the maximal concurrent failures tolerance f. Instead of storing for each of the individual data objects 500 the calculated value that was selected as spreading requirement, this calculated value can be derived from the parameter for the maximal concurrent failure tolerance f and the number of storage elements 300 identified in the metadata of the data object 500 by means of a simple subtraction. This allows to reduce the storage cost for the metadata as it doesn't require any additional entries in order to support the storage and retrieval method according to the invention.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. This is especially the case for the exemplary mentioning of all the sizes of data and numbers that have been described as parameters, they can easily be adapted to other suitable values and have only been mentioned in order to improve the clarity of the examples. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A distributed object storage system comprising:
   a plurality of storage nodes, each having a file system with a predetermined block size, the plurality of storage nodes comprising:
      a plurality of redundant storage elements, operable to store and retrieve a data object in the form of a predetermined number of redundant sub fragments comprising a data object identifier corresponding to said data object, said predetermined number of redundant sub fragments corresponding to a predetermined multiple of a desired spreading width, wherein the desired spreading width equals the sum of:
         a spreading requirement corresponding to a number of storage elements that store sub fragments of said data object and are not allowed to fail; and
         a maximal concurrent failures tolerance corresponding to a number of storage elements that store sub fragments of said data object and are allowed to fail concurrently;
      wherein each one of said predetermined number of redundant sub fragments comprises:
         encoded data of equal size, wherein said equal size of said encoded data is determined by dividing said data object by a factor equal to said predetermined multiple of said desired spreading width; and
         decoding data, such that said data object can be decoded from a first number of said predetermined number of redundant sub fragments, wherein said first number equals said predetermined multiple of said desired spreading width; and
   at least one controller node, operably connected to said plurality of storage nodes, said at least one controller node comprising:
      an encoding module operable to disassemble said data object into said predetermined number of redundant sub fragments;
      a spreading module operable to store one or more sub fragment files, each sub fragment file comprising a portion of said predetermined number of redundant sub fragments for storing on a single storage element, on a number of said plurality of redundant storage elements, wherein said number of said plurality of redundant storage elements is equal to said desired spreading width;
      a clustering module operable to retrieve said first number of said predetermined number of redundant sub fragments from said plurality of said storage elements; and
      a decoding module operable to assemble said data object from said first number of said predetermined number of redundant sub fragments;
   wherein said encoding module is further configured to:
      calculate a plurality of real storage costs, the plurality of real storage costs corresponding to a cumulative size of said sub fragment files, when encoded and stored on said file system, corresponding to a plurality of predetermined values of said spreading requirement and said predetermined block size;
      responsive to the size of said data object being smaller than a predetermined lower data object size threshold, select said spreading requirement based on a corresponding real storage cost, calculated using a predetermined value of said plurality of predetermined values, for which said corresponding real storage cost is minimal; and
      responsive to the size of said data object being equal to or larger than said predetermined lower data object size threshold, select as said spreading requirement a maximum value of said plurality of predetermined values of said spreading requirement.

2. The distributed object storage system according to claim 1, wherein said spreading module is configured to group all sub fragments to be stored on a single storage element into a single sub fragment file.

3. The distributed object storage system according to claim 1, wherein said plurality of predetermined values is an incremental range of integer values ranging from a predetermined minimum value to a predetermined maximum value.

4. The distributed object storage system according to claim 3, wherein said predetermined minimum value is one.

5. The distributed object storage system according to claim 1, wherein said lower data object size threshold is determined as a function of said block size of said file system in use on said storage elements.

6. The distributed object storage system according to claim 1, further comprising a metadata storage comprising metadata of said data objects stored on said storage elements, said metadata comprising:
   said data object identifier; and
   a list of identifiers of the storage elements on which sub fragments of said data object are stored.

7. The distributed object storage system according to claim 6, wherein said metadata further comprises:
   an identifier for said calculated value that was selected as spreading requirement by said encoding module.

8. The distributed object storage system according to claim 6, wherein said metadata further comprises an identifier of a type of storage and retrieval option that was used to store said data object.

9. The distributed object storage system according to claim 8, wherein said metadata further comprises the size of said data object and said predetermined lower data object size threshold, said clustering module configured to determine the type of storage and retrieval option that was used to store said data object by comparing the size of said data object with said predetermined lower data object size threshold.

10. The distributed object storage system according to claim 8, wherein said metadata comprises as a metadata parameter an identifier for said maximal concurrent failures tolerance, said clustering module and said decoding module being configured to determine the calculated value that was selected as spreading requirement for said data object by subtracting the maximal concurrent failures tolerance from the number of storage elements storing sub fragments as both provided by said metadata.

11. The distributed object storage system according to claim 6, wherein said metadata storage comprises at least one metadata parameter for a plurality of said data objects.

12. A method comprising:
    disassembling, by a controller node of a distributed object storage system, a data object into a predetermined number of redundant sub fragments, said predetermined number of redundant sub fragments comprising a data object identifier corresponding to said data object, said predetermined number of redundant sub fragments corresponding to a predetermined multiple of a desired spreading width, wherein the desired spreading width equals the sum of:
        a spreading requirement corresponding to a number of storage elements that store sub fragments of said data object and are not allowed to fail; and
        a maximal concurrent failures tolerance corresponding to a number of storage elements that store sub fragments of said data object and are allowed to fail concurrently;
    wherein each one of said predetermined number of redundant sub fragments comprises:
        encoded data of equal size, wherein said equal size of said encoded data is determined by dividing said data object by a factor equal to said predetermined multiple of said desired spreading width; and
        decoding data, such that said data object can be decoded from a first number of said predetermined number of redundant sub fragments, wherein said first number equals said predetermined multiple of said desired spreading width;
    calculating, by the controller node of the distributed object storage system, a plurality of real storage costs, the plurality of real storage costs corresponding to a cumulative size of one or more sub fragment files, when encoded and stored on said distributed object storage system, corresponding to a plurality of predetermined values of said spreading requirement and said predetermined block size, wherein each sub fragment file comprises a portion of said predetermined number of redundant sub fragments for storing on a single storage element;
    responsive to the size of said data object being smaller than a predetermined lower data object size threshold, selecting, by the controller node of the distributed object storage system, said spreading requirement based on a corresponding real storage cost, calculated using a predetermined value of said plurality of predetermined values, for which said corresponding real storage cost is minimal;
    responsive to the size of said data object being equal to or larger than said predetermined lower data object size threshold, selecting, by the controller node of the distributed object storage system, as said spreading requirement a maximum value of said plurality of predetermined values of said spreading requirement; and
    storing, by the controller node of the distributed object storage system, said one or more sub fragment files on a number of a plurality of redundant storage elements, wherein said number of said plurality of redundant storage elements is equal to said desired spreading width.

13. The method according to claim 12, wherein said plurality of predetermined values is an incremental range of integer values ranging from a predetermined minimum value to a predetermined maximum value.

14. The method according to claim 13, wherein said predetermined minimum value is one.

15. The method according to claim 12, wherein said lower data object size threshold is determined as a function of said block size of a file system in use on said storage elements.

16. The method according to claim 12, further comprising:
    storing, by the controller node of the distributed object storage system, metadata of said data objects stored on said storage elements, said metadata comprising:
    said data object identifier; and
    a list of identifiers of storage elements on which sub fragments of said data object are stored.

17. A controller node of a distributed object storage system, the controller node comprising:
    means for disassembling a data object into a predetermined number of redundant sub fragments, said predetermined number of redundant sub fragments comprising a data object identifier corresponding to said data object, said predetermined number of redundant sub fragments corresponding to a predetermined multiple of a desired spreading width, wherein the desired spreading width equals the sum of:
        a spreading requirement corresponding to a number of storage elements that store sub fragments of said data object and are not allowed to fail; and
        a maximal concurrent failures tolerance corresponding to a number of storage elements that store sub fragments of said data object and are allowed to fail concurrently;
    wherein each one of said predetermined number of redundant sub fragments comprises:
        encoded data of equal size, wherein said equal size of said encoded data is determined by dividing said data object by a factor equal to said predetermined multiple of said desired spreading width; and
        decoding data, such that said data object can be decoded from a first number of said predetermined number of redundant sub fragments, wherein said first number equals said predetermined multiple of said desired spreading width;
    means for calculating a plurality of real storage costs, the plurality of real storage costs corresponding to a cumulative size of one or more sub fragment files, when encoded and stored on said distributed object storage system, corresponding to a plurality of predetermined values of said spreading requirement and said predetermined block size, wherein each sub fragment file comprises a portion of said predetermined number of redundant sub fragments for storing on a single storage element;

means for selecting, responsive to the size of said data object being smaller than a predetermined lower data object size threshold, said spreading requirement based on a corresponding real storage cost, calculated using a predetermined value of said plurality of predetermined values, for which said corresponding real storage cost is minimal;

means for selecting, responsive to the size of said data object being equal to or larger than said predetermined lower data object size threshold, as said spreading requirement a maximum value of said plurality of predetermined values of said spreading requirement; and means for storing said one or more sub fragment files on a number of a plurality of redundant storage elements, wherein said number of said plurality of redundant storage elements is equal to said desired spreading width.

18. The controller node according to claim 17, wherein said plurality of predetermined values is an incremental range of integer values ranging from a predetermined minimum value to a predetermined maximum value.

19. The controller node according to claim 18, wherein said predetermined minimum value is one.

20. The controller node according to claim 17, wherein said lower data object size threshold is determined as a function of said block size of a file system in use on said storage elements.

* * * * *